United States Patent

Garberi et al.

[11] 4,054,639
[45] Oct. 18, 1977

[54] PROCESS FOR PREPARING MAGNETITE STARTING FROM FERROUS SULPHATE SOLUTIONS

[75] Inventors: Angelo Garberi, Cilavegna (Pavia); Agostino Geddo, Trecate (Novara); Gian Lorenzo Marziano, Novara, all of Italy

[73] Assignee: Montedison S.p.A., Milan, Italy

[21] Appl. No.: 552,620

[22] Filed: Feb. 24, 1975

[30] Foreign Application Priority Data

Feb. 25, 1974 Italy ............................ 48632/74

[51] Int. Cl.² .......................................... C01G 49/02
[52] U.S. Cl. ................................. 423/140; 423/151; 423/152; 423/632; 423/DIG. 2
[58] Field of Search ............. 423/632, 633, 634, 151, 423/152, 140, DIG. 2

[56] References Cited

U.S. PATENT DOCUMENTS

| | | | |
|---|---|---|---|
| 802,928 | 10/1905 | Fireman | 423/632 |
| 1,392,927 | 10/1921 | Fireman | 423/633 |
| 2,631,085 | 3/1953 | Bennetch | 423/632 |
| 3,617,562 | 11/1971 | Cywin et al. | 423/633 |
| 3,755,554 | 8/1973 | Lailch et al. | 423/633 |
| 3,845,198 | 10/1974 | Marcot | 423/634 |
| 3,931,007 | 1/1976 | Sugano et al. | 423/632 |

FOREIGN PATENT DOCUMENTS 433,333  8/1935  United Kingdom ............... 423/632

Primary Examiner—O. R. Vertiz
Assistant Examiner—Wayne A. Langel
Attorney, Agent, or Firm—Stevens, Davis, Miller & Mosher

[57] ABSTRACT

A process is disclosed for preparing magnetite having an equiaxial morphology and a narrow particle size dispersion by precipitation from a ferrous sulphate solution, characterized in that:

a. during a first step, at a temperature between 15° and 40° C, alkali is added to the ferrous sulphate solution, in a stoichiometric amount adapted to precipitate, in the form of ferrous hydroxide, ⅔ of the $Fe^{++}$ ion, and then, at the conclusion of said precipitation, air is blown thereinto thus oxidizing ferrous hydroxide to goethite $\alpha FeO(OH)$; and b. during a second step, alkali is added to the slurry obtained in the first step, the remaining $Fe^{++}$ is precipitated in the form of ferrous hydroxide, and the slurry is heated to a temperature between 70° and 100° C, thus causing the formation of magnetite which is then separated from the solution.

1 Claim, 1 Drawing Figure

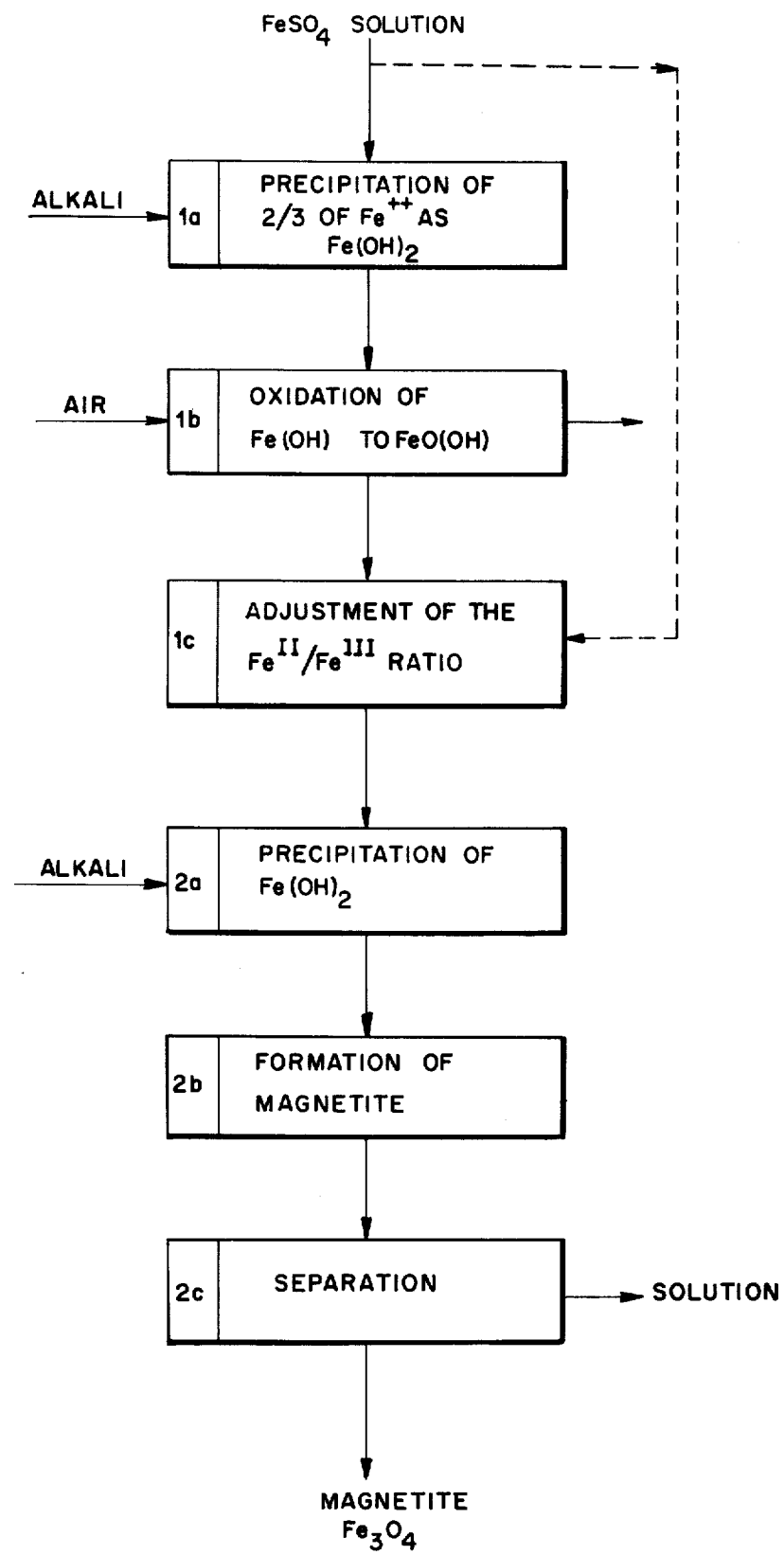

PROCESS FOR PREPARING MAGNETITE STARTING FROM FERROUS SULPHATE SOLUTIONS

The present invention relates to a process for preparing magnetite starting from ferrous sulphate solutions, and more particularly, to a process for preparing magnetite having an equiaxial morphology with a narrow particle size dispersion.

Known processes for obtaining magnetite starting from ferrous sulphate solutions generally consist in oxidizing such solutions so as to obtain solutions containing ferrous sulphate and ferric sulphate, from which magnetite is precipitated by means of alkali.

These processes, however, do not usually provide an equiaxial magnetite, much less a magnetite with a narrow particle size dispersion.

Thus, it is an object of this invention to provide a process suitable for treating ferrous sulphate solutions in order to obtain magnetite exhibiting an equiaxial morphology with a narrow particle size dispersion.

This and still other objects are readily achieved by the present invention, which involves a process for obtaining magnetite having an equiaxial morphology with a narrow particle size dispersion by precipitation from a ferrous sulphate solution. This process being characterized in that during a first step, and at a temperature ranging from 15° to 40° C, alkali is added to the ferrous sulphate solution in a stoichiometric amount in order to precipitate, in the form of ferrous hydroxide, ⅔ of the Fe++ ion, and subsequently, once this precipitation has taken place, air is blown thereinto, thus oxidizing ferrous hydroxide to goethite $\alpha FeO(OH)$;

during a second step, alkali is added to the slurry obtained in the first step, the remaining Fe++ being precipitated as ferrous hydroxide, and the slurry is heated to a temperature between 70° and 100° C, thus obtaining magnetite, which is separated from the solution.

Some operative details of the process according to this invention will now be described, with reference to the flow-sheet illustrated in the accompanying drawing. In step 1a, an alkali solution (preferably sodium hydroxide or ammonia) of any concentration (but preferably from 4 to 18 moles/liter) and in the stoichiometric amount necessary to precipitate ⅔ of the ferrous iron as $Fe(OH)_2$ is added, at a temperature ranging from 15° to 40° C (generally at room temperature and preferably at about 30° C), to a $FeSO_4$ solution of any concentration (preferably from 20 to 80 g/liter as Fe++).

Then air is blown with stirring into the slurry thus obtained (step 1b). The stirring intensity and the air flow rate affect the reaction velocity; generally a stirring intensity of about 1 kW/m³ of reaction mass and an air flow rate of 5 - 15 liters of air per liter of reactor per hour are used.

Under these conditions, ferrous hydroxide is oxidized to geothite, according to the overall reaction:

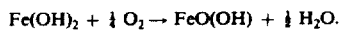

$Fe(OH)_2 + \tfrac{1}{2} O_2 \rightarrow FeO(OH) + \tfrac{1}{2} H_2O.$

The trend of the reaction is readily controllable by measuring through suitable electrodes the pH value and the redox potential of the solution. In fact, just after the alkali addition, the pH value ranges from 7 to 9 (depending on the Fe++ concentration of the starting solution) and the redox potential, measured by means of the usual calomel electrode, is between −600 and −900 mV. During the oxidation reaction the pH value decreases and the redox potential increases until, at the conclusion of the reaction, the former is between 3 and 4 and the latter between +20 and +250 mV.

The iron precipitated with the alkali is in the form of crystalline $\alpha FeO(OH)$ and exhibits an acicular morphology, a yellowish color, and a submicron particle size.

$FeSO_4$ solution is added to or is removed from the slurry, which contains a ferrous sulphate solution and acicules of $\alpha Fe(OH)$ (step 1c) in such fashion that the iron present therein constitutes 2 parts of ferric iron and 1 part of ferrous iron. The $Fe^{II}/Fe^{III}$ ratio must be regulated almost always because during the first step it is difficult to precipitate exactly ⅔ of the total iron.

The concentration of the total iron (soluble and precipitated) is optionally adjustable at will according to concentration or dilution techniques well known in the art, but in such way as to operate always in the cold condition.

To prevent acicules of unreacted $\alpha FeO(OH)$ from being present in the obtained equiaxial magnetite, the ratio between the ferrous iron and the ferric iron shall be suitably not lower than 0.50 (corresponding to the stoichiometric amount in the magnetite), and preferably equal to 0.50–0.55. Of course, if such ratio is considerably higher than the theoretical of 0.50 (for example 0.52), at the end of the second step ferrous iron in excess will be obtained, which, however, can be removed in the manner specified hereinafter.

Also for another reason it is convenient to operate with an excess of ferrous iron in solution at the beginning of the second step (i.e., with $Fe^{II}/Fe^{III}$ ratio higher than 0.50). In fact, it has been discovered in accordance with the present invention that if the starting ferrous sulphate contains magnesium (which always happens when the ferrous sulphate comes from the $TiO_2$ production cycle via sulphate), this impurity is incorporated into the magnetite when the $Fe^{II}/Fe^{III}$ ratio is lower than or equal to 0.50. Conversely, when the process is operated with an excess of Fe++ equal to 0.2–1 gram/liter with respect to the stoichiometric amount necessary to form magnetite, the magnesium content in the magnetite product thus obtained is lower than 0.1%.

The second step of the process of this invention consists in adding alkali to the slurry (step 2a) with slight stirring, so as to keep the reaction mass as homogeneous as possible, and in subsequently heating the reaction mass (step 2b).

Generally, as the alkali one will employ a sodium hydroxide or ammonia solution of any concentration (but preferably from 4 to 18 moles/liter) and not necessarily of the same concentration as the alkali utilized in the first step.

The amount of added alkali should be between the stoichiometric amount for the precipitation of the ferrous iron necessary for the magnetite and the stoichiometric amount that would be necessary for the precipitation of the whole ferrous iron present. The addition can be made either entirely at the temperature of the slurry at the end of the first step, or partly at such temperature and partly during the heating, keeping the pH valve approximately constant during the course of the addition of the alkali.

When all of the alkali has been added, the ferrous iron initially present in solution is practically completely precipitated as Fe(OH)$_2$.

On completion of the alkali addition, or after having reached the selected pH value which is to be kept constant during the rest of the addition (such value being preferably not lower than 7), the heating of the reaction mass begins, this mass being brought to a temperature ranging from 70° to 100° C (and preferably to about 90° C), always with slight stirring (step 2b).

During the entire second step, the stirring has merely the purpose of keeping the reaction mass homogeneous and therefore it may be conducted at the minimum level necessary to such end.

The formation of magnetite occurs in part already during the heating and for the remaining part during the succeeding period during which the slurry is kept at the prefixed constant temperature, according to the following overall reaction:

$$2\alpha FeO(OH) + Fe(OH)_2 \rightarrow Fe_3O_4 + 2H_2O.$$

Also during the second step it is possible to follow the trend of reaction throughthe values assumed by the pH and the redox potential. The former in fact, decreases from an initial value between 7 and 9 to a value between 5 and 7, while the latter passes from an initial value ranging from −600 to −900 mV to a value ranging from −200 to −600 mV. The wide range over which The initial and final values of these two parameters vary is attributable to the fact that they substantially depend on the operating conditions and in particular on temperature and concentrations. In any case, the conclusion of the reaction is indicated by the asymptotic trend of the pH and of the redox potential, after a variation with respect to the initial values has occurred (i.e., a pH decrease and a redox potential increase).

At the conclusion of the second step a slurry is obtained which is made up of an alkaline sulphate solution (for example ammonium or sodium sulphate, depending upon the alkali used) and of magnetite particles.

If the process has been carried out in such a way as to have at the beginning of the second step a slight excess of Fe++ with respect to the stoichiometric amount (Fe$^{II}$/Fe$^{III}$ ratio higher than 0.50), the magnetite-containing slurry will also contain this ferrous iron, largely as precipitated Fe(OH)$_2$. It is very easy to remove this impurity from the solid product; in fact, it is sufficient to bring the slurry to a pH value of about 4, preferably after the same has been cooled down to a temperature at least below 50° C, by the addition of a small amount of an acid (preferably sulphuric acid, mainly in order not to pollute the solution with other anions). Under these conditions the ferrous iron goes into solution while the magnetite does not dissolve.

The magnetite can be separated such as by any conventional method of solid-liquid separation, e.g., filtration. Depending upon the intended utilization of the magnetite product, it can be subsequently washed more or less thoroughly, optionally until disappearance in the washing waters of the SO$_4^{--}$ ion.

The process described above can be practiced with any type of ferrous sulphate (for example, pickling liquid, pure salt, ferrous sulphate coming from the titanium dioxide production cycle via sulphate).

Under the operating conditions of the process according to the present invention, some of the impurities contained in the starting ferrous sulphate solution tend to precipitate along with the magnetite. Therefore, if such impurities are undesired, a previous purification conducted according to known techniques may be necessary or desirable.

For example, the ferrous sulphate flowing from the titanium dioxide production cycle via sulphate contains, as main impurities, salts of Ti and of Mg.

To remove the titanium from the starting FeSO$_4$ solution, the pH of such solution is brought from an initial value of about 2 to a value between 3.5 and 4; under these conditions titanium precipitates as hydrated oxide and can be easily separated by filtration or decantation. In consequence of this operation the FeSO$_4$ solution that results is practically free from titanium (Ti concentration less than 0.01 g/liter). Ferrous sulphate may contain trivalent iron, which precipitates in a gelatinous and difficultly filtrable form along with titanium, rendering difficult the separation of the latter; in consequence, before carrying out the titanium removal, any ferric iron should be suitably reduced to ferrous iron by treating it with scrap iron.

Conversely, there are no particular problems as regards any magnesium contained in the starting ferrous sulphate solution. In fact, the operating conditions of the process according to this invention permit one to considerably reduce the co-precipitation of magnesium in the magnetite.

The magnetite prepared according to the process of this invention exhibits an equiaxial substantially cubic morphology and a narrow particle size dispersion. The average numerical diameter (i.e, the arithmetical means of the particle diameters) is between 0.1 and 1 μ and the numerical variancy coefficient is lower than 50 %, on the average around 20–30%. Said coefficient expresses the standard deviation as a percentage of the average diameter.

The morphological, particle size, and chemical purity characteristics of such magnetite are such as to permit one to obtain excellent red pigments by calcination in air at 650°-800° C.; furthermore it can be used as such as a black pigment. In addition, it is well suited, of course, to any other application of magnetite in powder form (production of ferrites, non-acicular γ-Fe$_2$O$_3$, etc.) It is also possible to regulate its particle size by varying the reagents concentrations; actually the dimensions of the magnetite obtained are the larger, the higher the Fe++ concentration at the beginning of the first step (that yields goethite acicular particles of larger dimensions) and the higher the total iron (soluble and precipitated) concentration at the beginning of the second step.

The following detailed working examples are given to illustrate other characteristics and advantages of the process according to the present invention:

EXAMPLE 1

FeSO$_4$.7H$_2$O, a by-product obtained from the H$_2$SO$_4$ treatment of ilmenite for producing TiO$_2$, was employed as raw material.

The ferrous sulphate had the following composition in percentage:

| | |
|---|---|
| FeSO$_4$ . 7H$_2$O | 80.65 |
| TiOSO$_4$ | 0.97 |
| MgSO$_4$ | 2.58 |
| H$_2$SO$_4$ | 0.32 |
| H$_2$O | 15.33 |
| Al$_2$(SO$_4$)$_3$ | 0.08 |
| MnSO$_4$ | 0.07 |
| Total | 100.00 |

After dissolving the salt in water, NaOH was added at room temperature to a pH value = 3.5 to precipitate titanium, then filtration was carried out. The resulting solution contained 46 g/liter of $Fe^{++}$ and was free from titanium. The ferrous sulphate solution was combined, always at room temperature, with an NaOH solution (325 g/liter) in the stoichiometric amount necessary to precipitate ⅔ of the iron present in the ferrous sulphate solution, at room temperature and with stirring. With further stirring and at room temperature, air was blown into the slurry containing ferrous hydroxide, measuring at the same time both the pH value and the redox potential. In a 16-hour period the pH decreased from an initial value of 7.6 to a value of 3.6, while the redox potential rose from −840 to +100 mV, the latter values remaining constant from which it was possible to infer that the oxidation reaction had ended.

The slurry containing microcrystals of $\alpha FeO(OH)$ exhibited a yellowish color and the following composition:

$Fe^{++}$ = 12.81 g/liter
$Fe^{III}$ = 27.12 g/liter
$Fe_{total}$ = 39.93 g/liter By adding a titanium-free ferrous sulphate solution at a concentration of 81.5 g/liter of $Fe^{++}$, and water, the $Fe^{II}/Fe^{III}$ ratio was adjusted to 0.542, thus obtaining a slurry having the following composition:

$Fe^{++}$ = 14.02 g/liter
$Fe^{III}$ = 25.86 g/liter
$Fe_{total}$ = 39.88 g/liter As can be seen from the composition values reported above, the excess of $Fe^{++}$ with respect to the stoichiometric amount was about 8%.

A solution (200 g/liter) of NaOH, in a stoichiometric amount corresponding to the ferrous iron necessary to form magnetite, with an excess of about 4%, was admixed with the slurry. This addition was carried out in the cold until a pH value of 7.5 was reached, whereupon it was continued at a constant pH, with heating, to exhaustion of the calculated alkali.

The temperature of the mass was brought to 90° C, with stirring, to bring about the desired reaction, controlling the trend of both pH and redox potential. After 2 hours and 10 minutes the pH had decreased from 7.5 to 6.45, while the redox potential had risen from −650 to −400 mV, whereupon both pH and redox potential remained constant, thus providing that the reaction had terminated.

The pH value of the mass was brought to 4 by the addition of a small amount of $H_2SO_4$ in order to dissolve the ferrous iron in excess existing as unreacted $Fe(OH)_2$ precipitate.

Magnetite was now filtered, washed and dried, whereupon it was analyzed from both a morphological and granulometric viewpoint, as well as from the chemical purity viewpoint. The results were as follows:

| | |
|---|---|
| morphology | cubic |
| average numerical diameter | 0.197μ |
| numerical variancy coefficient | 19.71% |
| specific surface | 6.14 m²/g |
| Mg content | 0.016% |
| Mn content | 0.13% |
| S content | 0.52% |

EXAMPLE 2

To a $FeSO_4$ solution from the $TiO_2$ production cycle via sulphate, having a concentration of 20 g/liter of $Fe^{++}$, previously freed from titanium by precipitation of same at a pH value of 3.5 and by subsequent filtration, was added an $NH_4OH$ solution (130 g/liter of $NH_3$) in the stoichiometric amount necessary to precipitate ⅔ of the iron present at room temperature and with stirring. Continuing with the stirring, air was then blown into the slurry containing the ⅔ of the iron precipitated in the form of $Fe(OH)_2$, measuring at the same time both the pH value and the redox potential. Over a 3-hour period the pH value decreased to 3.4 while the redox potential rose to +150 mV; these values remained constant from which it was inferred that the oxidation reaction had terminated, and the resulting slurry containing yellowish microcrystals of $\alpha FeO(OH)$ was employed for preparing magnetite. The composition of the reaction mass at this point was as follows:

$Fe^{++}$ = 5.16 g/liter
$Fe^{III}$ = 10.4 g/liter
$Fe_{total}$ = 15.56 g/liter

In order to have at the beginning of the second step a total iron concentration of 20 g/liter, the aforesaid slurry was decanted, thus obtaining a thickened product having the following composition:

$Fe^{++}$ = 5.16 g/liter
$Fe^{III}$ = 16.3 g/liter
$Fe_{total}$ = 21.46 g/liter

By adding water and a titanium-free ferrous sulphate solution having concentration of 65.5 g/liter of $Fe^{++}$, the $Fe^{II}/Fe^{III}$ ratio was adjusted at 0.56, thereby obtaining a slurry of the following composition:

$Fe^{++}$ = 7.19 g/liter
$Fe^{III}$ = 12.82 g/liter
$Fe_{total}$ = 20.01 g/liter As may be inferred from the composition values reported above, the $Fe^{++}$ excess with respect to the stoichiometric amount was about 12%.

A solution of $NH_3$ (200 g/liter) in the stoichiometric amount corresponding to the ferrous iron necessary to form magnetite, with a 5% excess, was added, in cold condition, to the slurry.

On completion of the addition of ammonia, the reaction mass was heated, while stirring, to 90° C and was allowed to react, meanwhile measuring the trend of the pH and of the redox potential.

After 2 hours and 30 minutes the pH value had fallen from 8.35 to 5.9 and the redox potential had risen from −700 to −450 mV. Since both pH and redox potential remained constant thenceforward, it was inferred therefrom that the reaction had ended.

The pH value of the reaction mass was brought to 4 by addition of a small amount of $H_2SO_4$ in order to dissolve the ferrous iron in excess existing as unreacted $Fe(OH)_2$ precipitate.

The product magnetite was filtered, washed and dried and then analyzed with regard to morphology and particle size, as well as with regard to chemical purity, the results being as follows:

| | |
|---|---|
| morphology | cubic |
| average numerical diameter | 0.208μ |
| numerical variancy coefficient | 19.97% |
| specific surface | 6.13 m²/g |
| Mg content | 0.02% |

| | |
|---|---|
| S content | 0.56% |
| Mn content | 0.09% |

EXAMPLE 3

This was carried out as in Example 2, but with the following variations:

concentration of the starting FeSO$_4$ solution: 40 g/liter of Fe$^{++}$ slurry composition after precipitation of αFeO(OH): Fe$^{++}$ = 14.3 g/liter, Fe$^{III}$ = 21.5 g/liter, Fe$_{total}$ = 35.8 g/liter composition of the thickened slurry: Fe$^{++}$ = 14.3 g/liter, Fe$^{III}$ = 39.7 g/liter, Fe$_{total}$ = 54 g/liter slurry composition after adjustment of the Fe$^{II}$/Fe$^{III}$ ratio before step 2a: Fe$^{++}$ = 13.7 g/liter, Fe$^{III}$ = 25.4 g/liter, Fe$_{total}$ = 39.1 g/liter Fe$^{II}$/Fe$^{III}$ ratio = 0.538.

The values of pH and of redox potential in the various steps were as follows:

at the conclusion of αFeO(OH) preparation: pH = 3.4; redox pot. = +110 mV;

at the the conclusion of ammonia addition for step 2a: pH = 8.15; redox pot. = −750 mV;

at the conclusion of magnetite precipitation: pH = 6.15; redox pot. = −510 mV.

The magnetite obtained after a 6-hour reaction at 85° C had the following characteristics:

| | |
|---|---|
| morphology | cubic |
| average numerical diameter | 0.239μ |
| numerical variancy coefficient | 22.19% |
| specific surface | 3.88 m$^2$/g |
| Mg content | 0.028% |
| Mn content | 0.12% |
| S content | 0.42% |

EXAMPLE 4

Again proceeding as in Example 2, but with the following variations:

concentration of the starting FeSO$_4$ solution: 60 g/liter of Fe$^{++}$ slurry composition after precipitation of αFeO(OH): Fe$^{++}$ = 14 g/liter, Fe$^{III}$ = 35.35 g/liter, Fe$_{total}$ = 49.35 g/liter composition of the thickened slurry: Fe$^{++}$ = 14.2 g/liter, Fe$^{III}$ = 41.1 g/liter, Fe$_{total}$ = 55.3 g/liter slurry composition after adjustment of the Fe$^{II}$/Fe$^{III}$ ratio before step 2a: Fe$^{++}$ = 18.9 g/liter, Fe$^{III}$ = 36.55 g/liter, Fe$_{total}$ = 55.45 g/liter Fe$^{II}$/Fe$^{III}$ ratio = 0.517

The values of pH and of redox potential in the various steps were as follows:

at the conclusion of αFeO(OH) preparation: pH = 3.75; redox pot. = +100 mV;

at the conclusion of NH$_3$ addition for step 2a: pH = 8.35; redox pot. = −760 mV;

at the conclusion of Fe$_3$O$_4$ precipitation reaction: pH = 6.8; redox pot. = −565 mV.

The magnetite product obtained after a reaction period of 13 hours and 30 minutes at 90° C exhibited the following characteristics:

| | |
|---|---|
| morphology | cubic |
| average numerical diameter | 0.547μ |
| numerical variancy coefficient | 45.73% |
| specific surface | 1.61m$^2$/g |
| Mg content | 0.058% |
| Mn content | 0.12% |
| S content | 0.43% |

EXAMPLE 5

A 6 m$^3$ reactor, provided with a heat exchange coil and a radial turbine stirrer, was fed with 3600 liters of a ferrous sulphate solution having a concentration of 40 g/liter of Fe$^{++}$.

Subsequently, 290 liters of an ammonia solution (200 g/liter of NH$_3$) were added thereto, while stirring at 142 r.p.m. corresponding to a power consumption of 3.5 kW; such stirring was carried on throughout the first step. Air was blown thereinto at a flow rate of 100 Nm$^3$/hr and the temperature was kept at about 30° C by cooling the heat exchange coil with water. The first step of the reaction was concluded when the pH value decreased to 3.5 and the platinum electrode, with respect to the calomel electrode, indicated +110 mV. This occurred about 7 hours after the beginning of the blowing in of air.

The analysis of the slurry was as follows:

Fe$^{++}$ = 11.1 g/liter; Fe$_{total}$ = 37.1 g/liter.

160 liters of a ferrous sulphate solution (63.5 g/liter of Fe$^{++}$) were admixed with the slurry. After this adjustment, the analysis of the slurry was as follows:

Fe$^{++}$ = 13.1 g/liter; Fe$_{total}$ = 38.5 g/liter, the Fe$^{II}$/Fe$^{III}$ ratio being 0.52.

The reactor was fed with 155 liters of an ammonia solution (195 g/liter of NH$_3$) with stirring at 110 r.p.m. corresponding to a power consumption of 4.0 kW. This stirring was continual throughout the second step. The temperature was brought to 90° C by conveying steam into the heat exchange coil, and the temperature was kept constant by means by a thermostat. During the reaction the pH value decreased from 8 to about 6.5. The second step of the reaction was terminated when the redox potential rose from −700 to about −450 mV. This occurred about 3 hours from the beginning of the heating. At the end, the ferrous iron present as Fe(OH)$_2$ was 0.34 g/liter of Fe$^{II}$. The slurry was acidified to a pH value = 4 to remove ferrous hydroxide. The magnetite, once filtered, washed and dried, exhibited the following characteristics:

| | |
|---|---|
| morphology | cubic |
| average diameter d$_{10}$ | 0.182μ |
| numerical variancy coefficient | 22.0% |
| Mg content | 0.04% |
| S content | 0.61% |
| specific surface | 6.52 m$^2$/g |

What is claimed is:

1. A process for preparing magnetite having an equi-axial morphology and a narrow particle size dispersion, starting from a ferrous sulphate solution containing magnesium, wherein in a first step about two-thirds of the Fe$^{++}$ ion is precipitated by means of an alkali in the form of ferrous hydroxide, which is then oxidized by means of air to goethite α-FeOOH, and in a second step the remaining Fe$^{++}$ is precipitated by means of an alkali in the form of ferrous hydroxide and the slurry is heated thus causing the formation of magnetite, said process being characterized in that, in order to prevent the co-precipitation of magnesium in the magnetite, at the conclusion of the oxidation reaction, a predetermined amount of ferrous sulphate solution is added to or removed from the slurry, so as to have an excess of $Fe^{++}$ equal to 0.2–1 g/liter with respect to the stoichiometric amount necessary for the formation of magnetite.

* * * * *